March 13, 1945.　　　C. B. MOORE　　　2,371,253
PNEUMATIC MEASURING INSTRUMENT
Filed May 28, 1942　　　2 Sheets-Sheet 1

INVENTOR.
COLEMAN B. MOORE
BY C. B. Spangenberg
ATTORNEY

March 13, 1945.   C. B. MOORE   2,371,253
PNEUMATIC MEASURING INSTRUMENT
Filed May 28, 1942   2 Sheets-Sheet 2

INVENTOR.
COLEMAN B. MOORE
BY C.B. Spangenberg
ATTORNEY

Patented Mar. 13, 1945

2,371,253

UNITED STATES PATENT OFFICE 2,371,253

PNEUMATIC MEASURING INSTRUMENT

Coleman B. Moore, Carroll Park, Pa., assignor to The Brown Instrument Company, Philadelphia, Pa., a corporation of Pennsylvania Application May 28, 1942, Serial No. 444,847

3 Claims. (Cl. 73—195)

This application relates to fluid operated apparatus and is a continuation in part of my copending application Serial Number 173,008, filed November 5, 1937, Patent 2,311,853 granted February 23, 1943.

The prime object of this invention is to provide an improved telemetering apparatus comprising a plurality of measuring devices or transmitters, each responsive to different variable quantities and each creating and transmitting an air pressure which varies with the quantity measured, and a receiver for measuring the air pressures transmitted by the transmitters, for totalizing the transmitted air pressures and for exhibiting the totalized transmitted air pressures and hence the sum of the quantities being measured by the transmitters.

Such a telemetering apparatus finds particular utility in exhibiting the total amount of fuel delivered to a furnace. For example, one transmitter may measure the amount of fuel supplied from one source to the furnace and the other may measure the amount of fuel supplied from another source to the furnace, where the furnace is heated by fuel from the two sources.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figures 1, 2, 3:
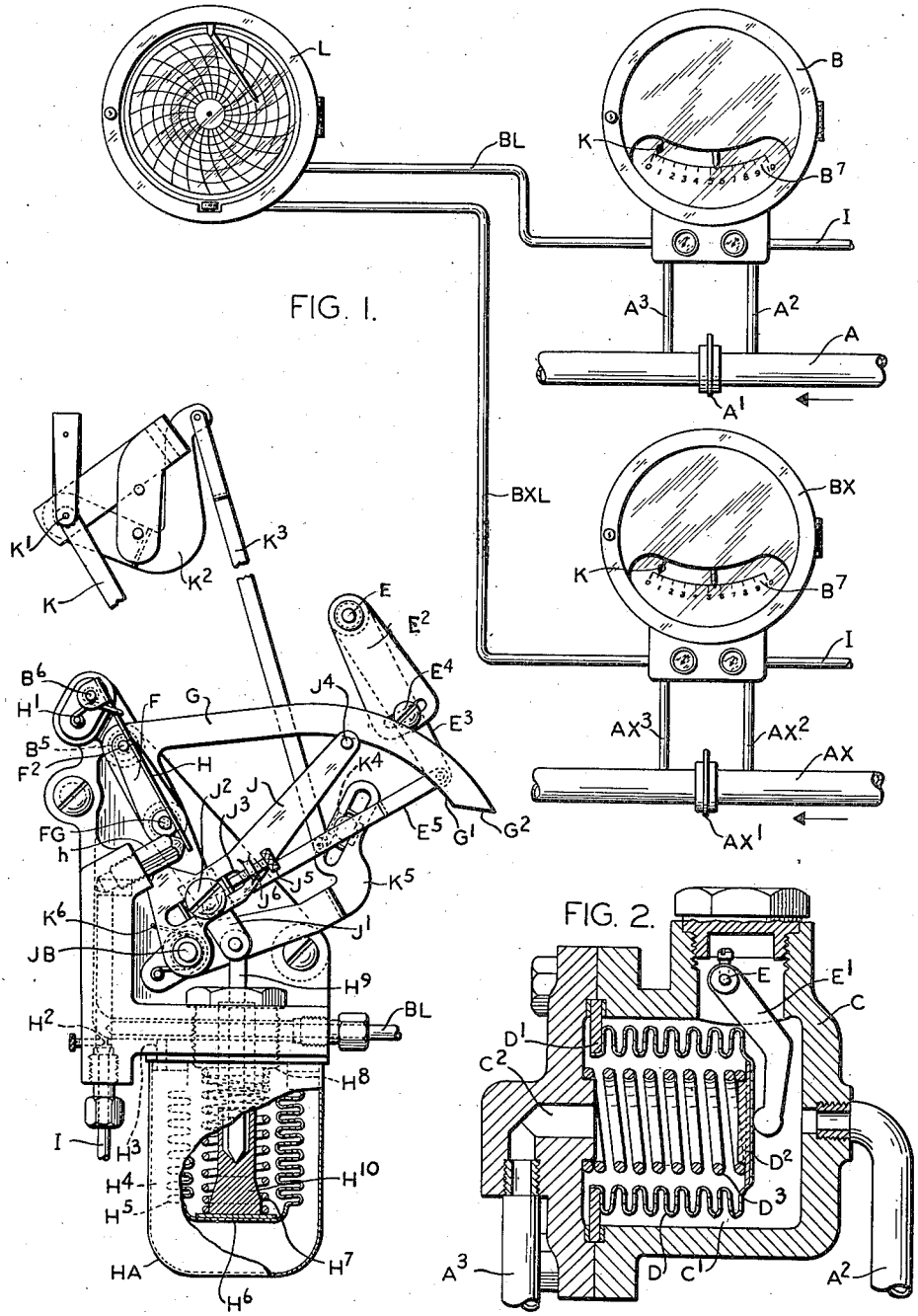
Fig. 1 is a diagrammatic representation of the telemetering apparatus, including a plurality of transmitters and a receiver.
Fig. 2 is a section through a manometer element of the transmitters shown in Fig. 1.
Fig. 3 is an elevation of the transmitter mechanism through which the manometer element regulates the pressure transmitted to the receiver.

Figure 1 illustrates two transmitters B and BX of identical construction for transmitting air pressures to the receiver L. A conduit A which may, for example, deliver fuel to a furnace includes an apertured orifice plate $A^1$ and the pressures at the high and low side of the apertured orifice plate $A^1$ caused by flow in the conduit in the direction of the arrow are transmitted by pipes $A^2$ and $A^3$, respectively, to the transmitter element B. The latter maintains an air pressure which varies as the flow through the conduit A varies and which is transmitted by the pipe BL to the distant receiver element L. In a like manner a conduit AX which may deliver fuel to the same or different furnace includes an apertured orifice plate $AX^1$. The pressures at the high and low sides of this apertured orifice plate $AX^1$ caused by flow through the conduit AX in the direction of the arrow are transmitted by pipes $AX^2$ and $AX^3$ to the transmitter element BX. The latter maintains an air pressure which varies as the flow through the conduit AX varies and which is transmitted by the pipe BXL to the distant receiver element L. The distant receiver element L is an instrument actuated by the air pressures transmitted to it through the pipes BL and BXL, for totalizing the air pressures and for recording the sum of the flows through the conduits A and AX.

The instruments B and BX are identical in construction and each includes a manometer C responsive to the differential of the pressures transmitted by the pipes $A^2$ and $A^3$ or $AX^2$ and $AX^3$. In the form shown in Figure 2 the manometer C comprises a casing enclosing a bellows chamber C'. A bellows D in the chamber C' is connected at one end to an annular member D' clamped between separable sections of the manometer casing and surrounding a port $C^2$ through which the pipe $A^3$ communicates with the interior of the bellows D. The opposite end of the bellows is closed by an end head $D^2$. The pipe $A^2$ opens to the manometer chamber C', and the bellows contracts and elongates, as required to balance the pressure in the pipe $A^2$, acting externally on the bellows, against the sum of two forces. One of said forces is the pressure in the pipe $A^3$ transmitted to the interior of the bellows D through the port $C^2$; and the other of said forces is the force of a spring $D^3$, which tends to elongate and opposes the contraction of the bellows D.

The elongation and contraction of the bellows D, gives counter-clockwise and clockwise rotative movements, respectively, to a rock shaft E passing through a wall of the manometer casing and making a pressure tight joint therewith, said shaft having an arm E' within the chamber C', which bears against the outer side of the movable bellows head end $D^2$, approximately at its center, in all normal positions of the arm E'. The shaft E and parts connected thereto are biased, as by means of gravity, to hold the arm E' lightly in contact with the movable bellows end D². Externally of the chamber C', the shaft E carries an arm E². As shown, the arm E² transmits the angular movements of the shaft E to an arm E³, which is pivotally mounted on the shaft E, but is normally clamped to the arm E², by the clamping screw E⁴. The latter, when loosened, permits of an angular relative adjustment of the arms E² and E³.

The oscillatory movements of the arm E³ operate through a link E⁵ to angularly adjust a lever F. The latter is connected by a pivot pin FG to a lever G which is mounted to turn about a fixed pivot B⁵. At its end remote from the link E⁵, the lever F carries a pin F² which controls the position of a flapper valve H relative to the nozzle, or bleed orifice, $h$, of the air controller valve mechanism of the instrument B. The flapper H is pivoted at B⁶, and is biased for movement toward the nozzle $h$ by a spring H', and is moved away from nozzle $h$, or permitted to approach the latter, accordingly as the pin F² is adjusted to the right or to the left, as seen in Fig. 3. The pin F² is moved to the right by a clockwise adjustment of the lever F about its pivot FG, and also by a counter-clockwise adjustment of the lever G about its supporting pivot B⁵. On a counter-clockwise adjustment of the lever F, and also on a clockwise adjustment of the lever G, the pin F² is moved to the left, thereby permitting the valve H to approach the nozzle $h$. The nozzle $h$ receives air through a restricted orifice H², from a compressed air supply pipe I. The nozzle pressure of the instrument B, i. e., the pressure at the outlet side of the restricted orifice H², depends upon the distance of the flapper valve H from the nozzle $h$, and the valve H is adjusted as required to make that pressure vary with the angular position of the shaft E.

In the apparatus shown in Fig. 2, the angular adjustment of the shaft E will be in linear proportion to the difference between the pressures at the opposite sides of the orifice plate A'. That pressure difference, while a function of the flow through the conduit A, is not in linear proportion thereto, but is approximately proportional to the square of the flow through the conduit A. For various reasons, it is practically important and desirable that the pressure in the nozzle $h$, which is the pressure transmitted to the receiver L, should vary in linear proportion with the flow through conduit A, and this result is obtained with the mechanism shown in Fig. 3, by its provisions for automatically adjusting the lever G about the pivot B⁵, in response to variations in the nozzle pressure. As shown, the shaft E will move clockwise in Figure 2 for an increase in flow through pipes A or AX, while the shaft E in Figure 3 will move in a counter-clockwise direction for an increase in flow.

To so adjust the lever G, the nozzle pressure is transmitted through a passage H³ to a bellows chamber H⁴ in a flapper adjusting pressure responsive device HA, which, as shown, supports the nozzle $h$, flapper H, lever G, and other parts. A bellows element H⁵ is located in the chamber H⁴ and has one end anchored to an end wall of said chamber. The opposite and movable end of the bellows H⁵, is closed by a head H⁶. The interior of the bellows H⁵ is exposed to the pressure of the atmosphere. The nozzle pressure transmitted to the chamber H⁴ from the passage H³, acts externally on the bellows H⁵, tending to compress or shorten the latter. The contraction of the bellows is opposed by a resilient force which may comprise a component due to the resiliency of the bellows H⁵, and a component due to a spring H⁷. The tension of the latter may be adjusted by adjustment of a threaded abutment member H⁸.

Changes in length of the bellows H⁵, give corresponding angular adjustments to a lever J journalled on a stationary pivot JB. As shown, the lever J is operatively connected to the bellows by a plunger H⁹, having one end engaging an abutment member H¹⁰ within the bellows and carried by the movable end head H⁶ of the latter and having its opposite end pivoted to a connection part J' connected to the lever J by a clamping screw J² passing through a slot J³ in the lever J, whereby the pivotal connection between the plunger H⁹ and the connection part J' may be adjusted toward and away from the pivot JB for the lever J. A micrometer screw J⁵ threaded through a projection J⁶ on the lever J is used to adjust the connection part J' along the lever J with a great degree of accuracy. The lever J is provided at its free end with a pin or projection J⁴ which engages the cam edge G' of a cam lever G.

The cam edge G' is so shaped with reference to the movement of the cam lever about its pivot B⁵, and with reference to the movement of the projection J⁴ about the pivot JB, that as the link E⁵ moves in approximate proportion to variations in the square of the rate of flow through the conduit A, the adjustments thereby given to the valve H by the pin F², are so modified by the adjustment of the cam lever G effected by the change in the pressure in the chamber H⁴, that said change in pressure will be in linear proportion to the change in said flow. As will be apparent, when the functional relation of the flow or other quantity measured, to the angular movement of the lever J is known, the cam edge G' can be given the shape necessary to make the pressure in the chamber H⁴ proportional to the flow or other quantity measured.

As shown, the instrument B includes flow indicating means comprising an index K pivoted at K' to deflect along an instrument scale B⁷ in accordance with the flow through conduit A. The index K is deflected by means of a link K³ connected to an arm K² pivoted coaxially with the index K and rigidly connected to the latter. The link K³ operatively connects the index K to the lever J. To this end, in the construction illustrated, in Fig. 3, the link K³ is pivotally connected through a connection part K⁴, to a lever arm K⁵, coaxial with the lever J and sharing the angular movements of the latter. The part K⁴ is connected to the arm K⁵ by a clamping screw and slot, so as to permit of an adjustment in the ratio of the angular movements of the lever J and the index K. The arm K⁵ is connected to the lever J so as to turn with the latter and imparts its movements to the index K. A spring K⁶ is provided to exert a clockwise bias on levers J and K⁵ to insure a more positive movement thereof than that of gravity. It is noted that counter-clockwise movement of lever J or upward movement of plunger H⁹ is limited by engagement between the upper edge of abutment member H¹⁰ and the lower edge of member H⁸.

As the flow through the conduit A varies, the pressure differential transmitted by the pipes A² and A³ to the manometer C, elongates or contracts the bellows D, and thereby gives angular movement to the shaft E. Each angular movement of the latter, gives an angular movement to the lever F, and thereby adjusts the flapper H. The resultant change in the pressure in the nozzle $h$ acts through the bellows $H^5$ to effect an adjustment of the lever J along the cam edge $G'$, and thereby effects a further adjustment of the valve H. With the cam edge $G'$ of the lever G suitably shaped, the ultimate adjustment given the flapper valve H will be that required to vary the control pressure in the nozzle $h$ in accordance with the change in the rate of flow in the conduit A, although the pressure differential transmitted by pipes $A^2$ and $A^3$ varies approximately in proportion to the square of the flow through the conduit.

The transmitter B is so adjusted that at the minimum flow which it is desired to record, for the range of the manometer being used, the pin $J^4$ will be engaging lever G at the point where the cam surface $G'$ intersects a second cam surface $G^2$ of the lever G, and the air pressure in space $H^4$ will be at the lowest value it assumes for transmitting purposes. The inclination of cam surface $G^2$ with respect to the path of movement of pin $J^4$, is such that when the pin $J^4$ is in engagement with the surface $G^2$, a given change in pressure in the space $H^4$ will result in a greater angular adjustment of the lever G, than when surface $G'$ is engaged by the pin $J^4$. In consequence, a movement of the link $E^5$ of given extent, will result in a smaller change in the pressure in space $H^4$, when pin $J^4$ is in engagement with surface $G^2$ than when in engagement with surface $G'$. Since the variation in this air pressure causes a consequent variation in the setting of the indicator K, the use of the cam surface $G^2$ provides a more definite zero point, which would otherwise be critical due to the high multiplying factor of surface $G'$. When the transmitter is not operating, the air pressure in space $H^4$ becomes equal to that of the atmosphere, and the indicating hand pointer K will move below the zero of scale $B^7$ in Fig. 1, thus showing that the instrument is out of service.

Transmitter element BX operates in the same manner as transmitter element B, each maintaining a pressure in the pipes BL and BXL, respectively, a pressure corresponding to the rate of flow through conduits A and AX, respectively.

Figure 4:
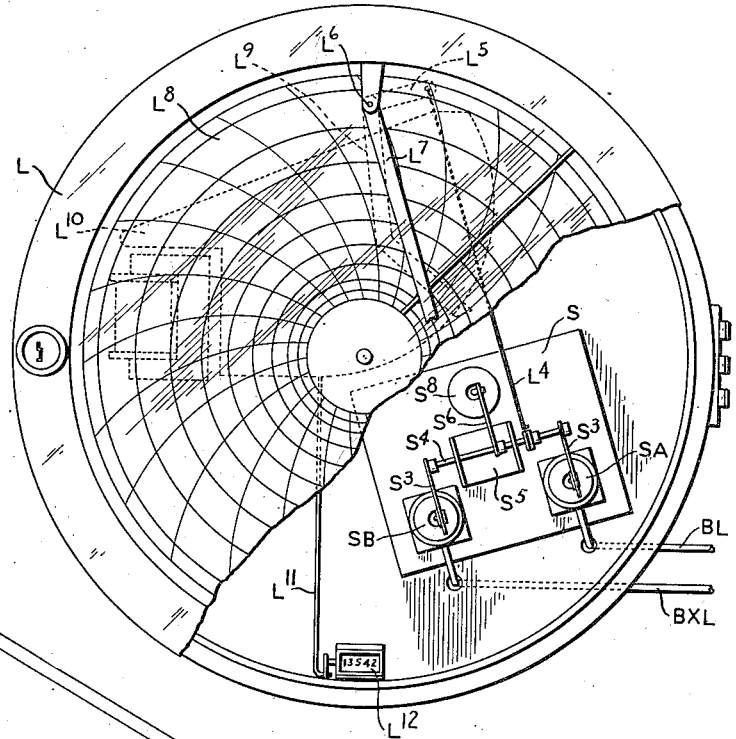
Fig. 4 is an elevation with parts broken away of the receiver.
Figure 5:
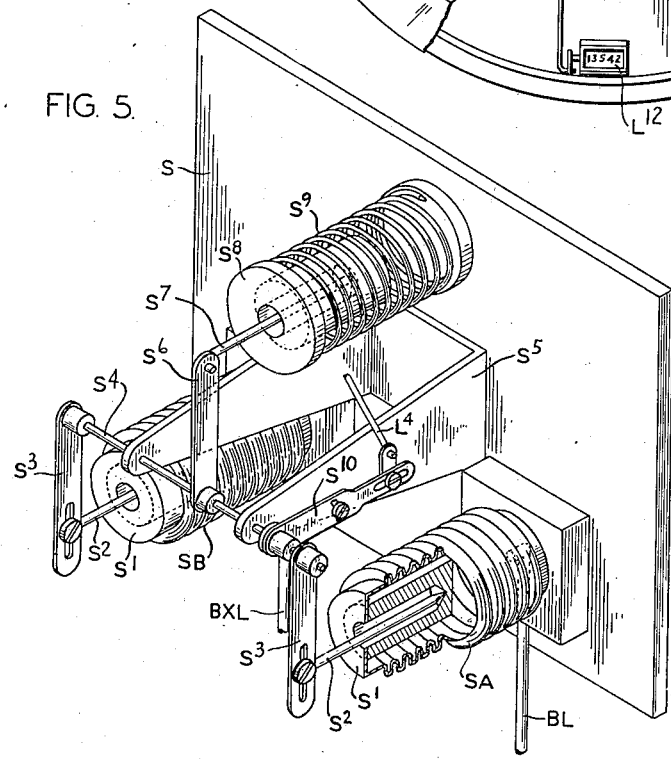
Fig. 5 is a perspective view of the totalizing device of the receiver.

The receiver L is shown in detail in Figs. 4 and 5. The pipe BL transmits the air pressure from transmitter B to a bellows SA and the pipe BXL transmits the air pressure from the transmitter BX to a bellows SB. Each of the bellows SA and SB has one end secured to a support S, and has its movable opposite end $S'$ formed with a portion extending axially into the bellows and recessed to provide a seat for one end of a corresponding plunger or thrust rod $S^2$. Each rod $S^2$ has its outer end connected to a corresponding arm $S^3$ of a rock shaft $S^4$ journalled in a bracket $S^5$ mounted on the support S.

An increase in the pressure transmitted to either bellows SA or SB, tending to elongate that bellows, tends through the corresponding arm $S^3$ to give a clockwise adjustment to the shaft $S^4$, in the clockwise direction as shown in Fig. 5, and such adjustment of the shaft $S^4$ is effected by an increase in the aggregate bellows pressure acting on the shaft through the two arms $S^3$. The extent of the shaft adjustment effected by a given increase in the aggregate bellows pressure is determined by means comprising an arm $S^6$ secured to the shaft $S^4$ and connected through a connecting rod $S^7$ to the spring abutment $S^8$ bearing against the movable end of a spring $S^9$. The latter has its opposite end supported by the support S, so that a clockwise adjustment of the shaft $S^4$ is opposed by, and increases, the compression of the spring $S^9$. The angular position of the shaft $S^4$ is thus proportional to the sum of the pressures transmitted to the two bellows SA and SB from the transmitters respectively connected thereto by the two pipes BL and BXL.

The angular adjustment of the rock shaft $S^4$ acts through a rock shaft arm $S^{10}$ to give motion to a link $L^4$. The motion of the latter may adjust an exhibiting pointer or pen arm, a control element, or a plurality of elements. As shown the connection between each plunger $S^2$ and the corresponding arm $S^3$ is adjustable toward and away from the shaft $S^4$ thus providing for adjustment of the ratio between a quantity represented by the pressure transmitted by the corresponding bellows SA or SB and the tension of the spring $S^9$. Stated differently, the relative adjustability of the distances between the shaft $S^4$ and the connections of the different arms $S^3$ with the corresponding plunger $S^2$ permits the effects of changes in pressure in the different bellows SA and SB to be brought into suitable scale relationship. As shown the link connection between the link $L^4$ and arm $S^{10}$ is adjustable toward and away from the shaft $S^4$, and this adjustment may be employed to adjust or calibrate the exhibiting means actuated by the link $L^4$ so as to obtain full scale deflection for a given magnitude of variation in the sum of the pressures in the different bellows SA and SB.

As will be apparent the pressures in the bellows SA and SB must vary in linear proportion with the quantities of which they are measures, in order that the bellows and associated apparatus may exhibit or produce a control effect proportional to the sum of said quantities.

The link $L^4$ operates through an arm $L^5$ to rotate a shaft $L^6$ in accordance with the summation of the pressures acting on the bellows SA and SB. The shaft $L^6$ operates a pen arm $L^7$ for recording the total pressures on a rotatable chart $L^8$. The shaft $L^6$ may also operate an arm $L^9$ which controls the operation of an integrator mechanism $L^{10}$ which may be of the type shown and described in T. R. Harrison Patent 1,743,853, granted January 14, 1930. This integrator apparatus $L^{10}$ may operate an arm $L^{11}$ for operating a counter $L^{12}$ for exhibiting the integrated values of the total pressures acting on the bellows SA and SB.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a pneumatic measuring system for measuring the sum of a plurality of independent flows, the combination of a first independent instrument operative to set up an air pressure proportional to the value of a first flow, a second independent instrument operative to set up an air pressure proportional to the value of a second flow, a third remotely located independent instrument including therein a first and a second pressure responsive device, means to apply said first air pressure to said first device, means to apply said second air pressure to said second device, the responses of said devices being proportional to the value of the pressures applied thereto, resilient means to oppose the combined action of said two devices, a lever system connecting said devices for operation to oppose the action of said resilient means, and an exhibiting element adjusted by said lever system.

2. In a pneumatic measuring system for measuring the sum of a plurality of independent variables, the combination of independently located means to transmit independently a plurality of air pressures which are proportional to the values of a plurality of independent variables, respectively, a remotely located instrument to receive said air pressures and add the same comprising an expansible pressure responsive device for each air pressure, means to individually conduct said air pressures to said devices, each of said devices being mounted to expand in the same direction upon an increase in air pressure therein, a pivoted shaft, a pair of arms attached to said shaft and extending in the same direction to be moved with said shaft as said devices expand and contract, a resilient opposing means, a third arm also attached to said shaft and extending in a direction opposite to said first mentioned arms and connected to said opposing means whereby as said devices expand their combined action will be opposed by said opposing means, an exhibiting element, and connecting means between said arms and said exhibiting element whereby the latter may be moved to a position dependent upon the expansion of said devices.

3. In a pneumatic measuring system for measuring the sum of a plurality of independent variables, a receiving instrument including a first and a second expansible pressure responsive device mounted to act in a given direction, a resilient opposing member mounted to act in opposition to said devices, supports located between said devices and said member, a shaft mounted for rotation in said supports, a pair of lever arms extending in one direction from said shaft in positions in which each one overlies one of said devices, a third lever arm extending from said shaft in the opposite direction in a position to overlie said member, connecting means between said arms and said devices and member respectively whereby expansion of said devices will cause a contraction of said member, and an exhibiting element moved by said shaft as it is rotated by said lever arms.

COLEMAN B. MOORE.